UNITED STATES PATENT OFFICE.

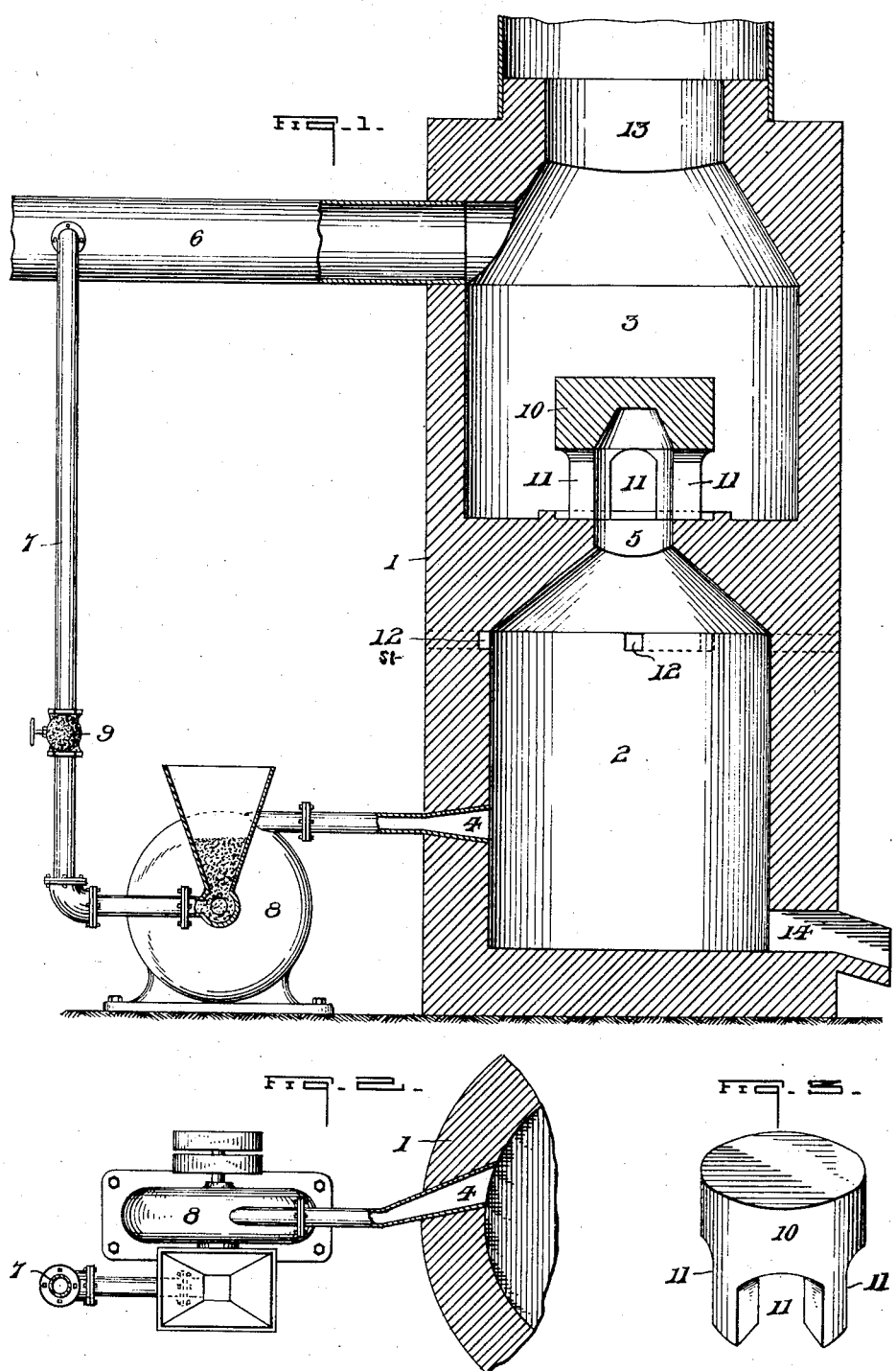

JULES H. HIRT, OF SEWICKLEY, PENNSYLVANIA, ASSIGNOR, BY MESNE ASSIGNMENTS, TO ALLIS-CHALMERS COMPANY, OF MILWAUKEE, WISCONSIN, A CORPORATION OF NEW JERSEY.

APPARATUS FOR MAKING GAS.

1,037,764.  Specification of Letters Patent.  Patented Sept. 3, 1912.

Application filed November 30, 1908. Serial No. 465,425.

*To all whom it may concern:*

Be it known that I, JULES H. HIRT, a citizen of the United States, residing at Sewickley, in the county of Allegheny and State of Pennsylvania, have invented a new and useful Improvement in Apparatus for Making Gas, of which improvement the following is a specification.

My invention relates to apparatus for making gas.

The objects of my invention are to produce a simple and efficient method of making producer gas continuously, and the production of an efficient apparatus adapted to carry out said method.

In the accompanying drawings, I show a form of apparatus adapted to carry out said method, in which—

Figure 1 is a diagrammatic view of the apparatus, the producer being shown in section. Fig. 2 is a plan view of the material charging mechanism and a section of a portion of the furnace. Fig. 3 is a plan view of the cap.

In carrying out my improved method, I charge finely divided carbonaceous material admixed with air into a closed chamber, ignite the same and admit sufficient air to convert the material into carbon dioxid, and continue to so heat the furnace until the refractory lining of the furnace is highly heated. After the interior of the furnace is incandescent or almost in this condition, the volume of air is reduced until only sufficient is admitted to convert said material to carbon monoxid. Steam or other form of moisture is admitted at a point of highest temperature in said furnace which subserves the two fold function of controlling the temperature and enriching by disassociating hydrogen therefrom the gas evolved. The carbonaceous material admixed with air is charged into the chamber under pressure tangentially to the walls thereof whereby the material under pressure is given a circulatory movement and caused to contact or impinge upon the incandescent or highly heated walls of said chamber whereby any free carbon therein adheres to said walls and remains thereon in an incandescent state, the force and direction given the incoming gases causing the same to assume a vortex shape in its ascent and permitting any carbon dioxid that may be evolved to be converted to carbon monoxid by contact with the incandescent carbon on the walls of said chamber. The peculiar circulatory movement of the gases serves to bring the highly heated gases in constant contact with incoming material quickly gasifying the same. A portion of the carbon monoxid gas is conveyed from the upper end of the producer and readmitted with the carbonaceous material and air at the lower end thereof for the purpose of drying the carbonaceous material without introducing any excess oxygen.

Referring to said drawings, 1 is a vertically disposed furnace, preferably circular in cross section. The interior of said furnace is divided into two compartments, 2 and 3, the lower one, 2, of which is preferably circular in cross section, and is provided with an opening 4 which is disposed tangentially relatively to the axis of the chamber, whereby when finely divided carbonaceous material is charged into said chamber it is caused to travel in a circulatory path so that the highly heated gases thereof meet the incoming material and raise the temperature thereof very considerably, and vortex like the gas ascends toward the contracted top of the chamber and passes through the opening 6 into chamber 3, and is conveyed through pipe 6 to any suitable gas receiver (not shown). A portion of gas passing from said chamber 3 through pipe 6 may be taken from said pipe 6 through pipe 7 and discharged into the fan, 8, where it serves to dry said material before the same is charged into the chamber 2. A valve 9 in said pipe 7 controls the admission of said gas. A cap 10 in which passages 11, 11 are formed is placed immediately over said opening 5, although checker work or other form of retardent may be used to prevent the escape of free carbon, if any might be in the carbon monoxid admitted to chamber 3. At a point in chamber 2 where the highest temperature is attained, *i. e.*, where it begins to contract a series of steam jets 12 enter for the purpose of regulating or controlling the temperature of said chamber, whereby the usual refractory materials may be employed in the construction of the furnace, otherwise without the introduction of the steam the temperature attained at this point in the furnace would quickly destroy the most highly refractory materials. The introduction of the steam at this point by disassociating hydrogen therefrom serves to produce a better quality of gas than is usually obtained.

The apparatus herein referred to is broadly claimed in application S. N. 465,424, filed Nov. 30, 1908; and the process broadly in application 543,726 filed Feb. 14, 1910.

The gas evolved may be taken off through the opening 13 in the top of the producer instead of through pipe 6, and the slag from the impurities contained in the material is removed through the opening 14.

The orifice 4 for the admission of carbonaceous material is disposed at a tangent to the walls of the chamber 2 and is connected with any suitable fan, 8, for reducing the material to a finely divided state, and means for admitting thereto air under pressure.

Having described my invention, what I claim and desire to secure by Letters Patent is:

1. In a device for making gas, the combination of two communicating chambers one above the other, an orifice tangent to the walls and directed into the lower chamber to admit gas forming material, means to admit moisture to said lower chamber at a point near the top thereof, a cap located at the opening between said chambers having passages therein, a gas off-take from said upper chamber, means to convey a part of said gas to the gas forming material, and means to force said admixture into the lower chamber.

2. In a device for making gas, the combination of two chambers separated from each other by a partition, an opening in said partition from one of said chambers to the other, a cap located directly in line with said opening, means for supply of gas forming material to one of said chambers, a gas off-take from the other of said chambers, and means for conveying a portion of said gas to said means for supply of gas forming material.

In testimony whereof, I have hereunto signed my name in the presence of two subscribing witnesses.

JULES H. HIRT.

In the presence of—
CLARENCE A. WILLIAMS,
JOHN H. RONEY.